United States Patent [19]
Shigehara et al.

[11] Patent Number: 4,813,008
[45] Date of Patent: Mar. 14, 1989

[54] MULTIPLIER CIRCUIT SUITABLE FOR OBTAINING A NEGATIVE PRODUCT OF A MULTIPLIER AND A MULTIPLICAND

[75] Inventors: Hiroshi Shigehara, Machida; Mikio Shiraishi; Yasuhiro Watanabe, both of Yokohama; Nobuo Sugi, Kawasaki, all of Japan

[73] Assignee: Kabushiki Kaisha Toshiba, Kawasaki, Japan

[21] Appl. No.: 28,183

[22] Filed: Mar. 19, 1987

[30] Foreign Application Priority Data

Mar. 31, 1986 [JP] Japan .................... 61-71179

[51] Int. Cl.$^4$ ............................. G06F 7/52
[52] U.S. Cl. ............................. 364/760
[58] Field of Search ............ 364/760, 757, 754

[56] References Cited

U.S. PATENT DOCUMENTS

| 3,153,938 | 5/1979 | Ghest et al. | 364/760 |
| 4,238,833 | 12/1980 | Ghest et al. | 364/760 |
| 4,546,446 | 10/1985 | Machida | 364/760 |
| 4,575,812 | 3/1986 | Kloker et al. | 364/760 |

OTHER PUBLICATIONS

Rubinfield, "A Proof of the Modified Booth's Algorithm for Multiplication" *IEEE Trans. on Computers*, Oct. '75, pp. 1014–1015.

Beraud et al., "Parallel Multiplier" *IBM Tech. Disclosure Bulletin*, vol. 24, No. 11B, Apr. '82, pp. 6090–6092.

*Primary Examiner*—David H. Malzahn
*Attorney, Agent, or Firm*—Finnegan, Henderson Farabow, Garrett, & Dunner

[57] ABSTRACT

A $\overline{Pi}$ generator receives the multiplier data Y and produces the $\overline{Pi}$ on the basis of the data $Y2i$, $Y2i+1$, and $Y2i+2$ of three continuous bits of the multiplier data Y (in which, it is defined that $Pi = Y2i + Y2i+1 - 2 \cdot Y2i+2$, $\overline{Pi} = \overline{Y2i} + \overline{Y2i+1} - 2 \cdot \overline{Y2i+2'}$ and $Y0=0$, and $i = 0, 1, \ldots, n/2-1$, and $Yj$ is the bit data of the jth bit of the multiplier Y). A partial-product generator receives the $\overline{Pi}$ from the $\overline{Pi}$ generator and a multiplicand X, and obtains the partial products $X \cdot Pi$ of the multiplicand X and the Pi. A partial-product adding circuit weights $2^{2i}$ to the partial products $X \cdot Pi$ derived by the partial-product generator, and adds the resultant data, thereby producing the negative product $(-X \cdot Y)$ of the multiplicand X and multiplier Y.

20 Claims, 9 Drawing Sheets

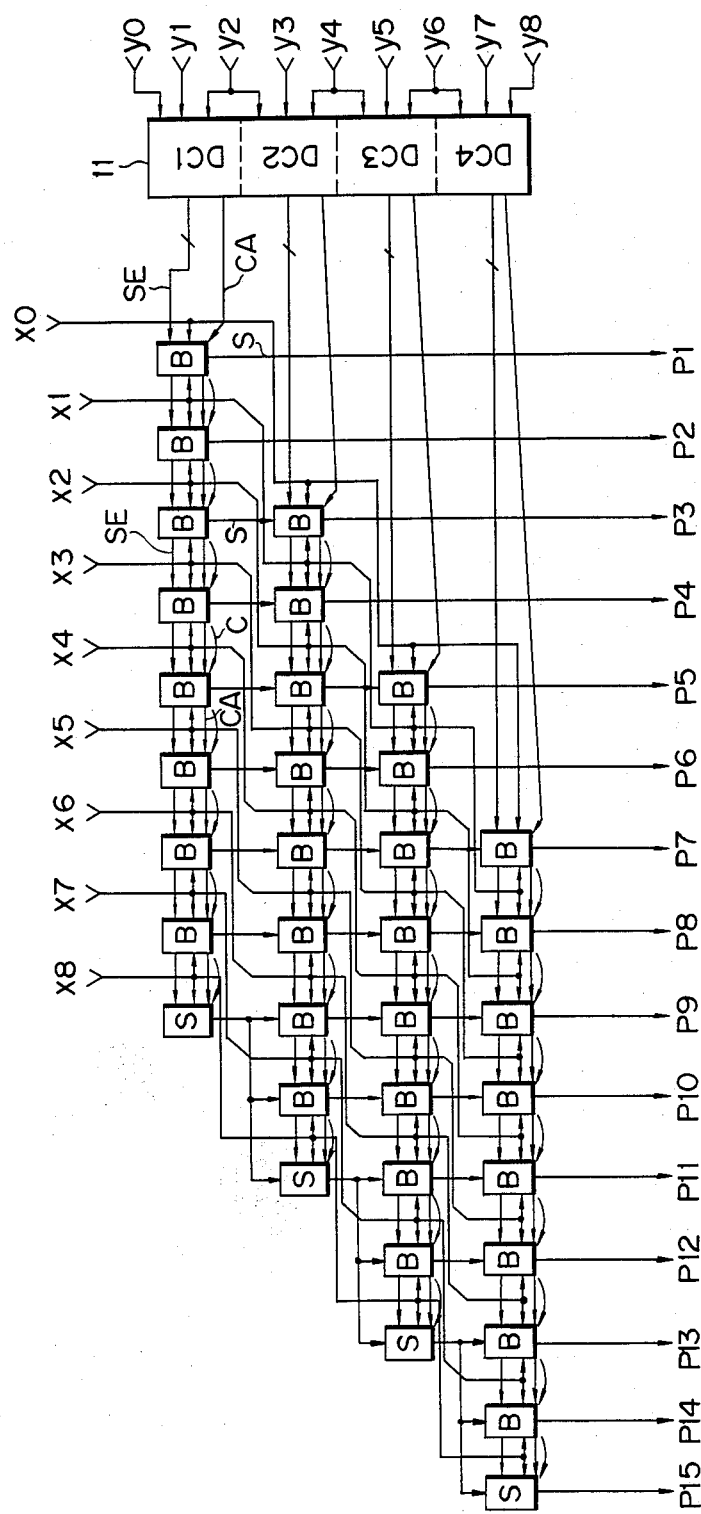
F I G. 4

MULTIPLIER CIRCUIT SUITABLE FOR OBTAINING A NEGATIVE PRODUCT OF A MULTIPLIER AND A MULTIPLICAND

BACKGROUND OF THE INVENTION

The present invention relates to the improvement of a parallel multiplier which is constituted on the basis of Booth's secondary algorithm.

Various methods for realizing the performing of high-speed parallel arithmetic operations of binary form have been proposed (e.g., refer to NIKKEI ELECTRONICS, May 29, 1978, pages 76 to 89). Use of Booth's secondary algorithm is known as one of these methods. In Booth's algorithm, the product X·Y is obtained in the following manner from the data X and Y which are expressed as the 2's complement. First, the input X and Y are modified as follows:

$$X = -2^{m-1} \cdot x_m + 2^{m-2} \cdot x_m - 1 + \ldots + 2^0 \cdot X_1$$
($m$-bits data)

$$Y = -2^{n-1} \cdot y_n + 2^{n-2} \cdot y_n - 1 + \ldots + 2^0 \cdot Y_1$$
($n$-bits data)

where, $x_m$ and $y_n$ are sign bits and n is an even number.

The product X·Y is then modified as shown in the following expression:

$$X \cdot Y = X \cdot (-2^{n-1} \cdot y_n + 2^{n-2} \cdot y^{n-1} + \ldots + 2^0 \cdot y_1)$$
$$= X \cdot \sum_{i=0}^{(n-1)/2} (y_{2i} + y_{2i+1} - 2 \cdot y_{2i+2}) \cdot 2^{2i}$$
$$= \sum_{i=0}^{(n-1)/2} X \cdot p_i \cdot 2^{2i}$$

where, $y_0=0$, $p_i = y_{2i}+y_{2i+1}-2 \cdot y_{2i+2}, i=0, 1 \ldots (n-1)/2$, and $y_n$ is most significant bit MSB.

$p_i$ is derived by decoding three continuous bits of the multiplier Y. Pi has a value of either one of 0, ±1, and ±2. Therefore, the value of the partial product X·pi is either one of 0, ±X, and ±2X. The partial product pi·X can be produced by a simple process of inverting and/or shifting the multiplicand X, on the basis of the value of pi. The number of partial products is n/2. Therefore, in the parallel multiplier using Booth's algorithm, it is sufficient to use n/2 partial product adding circuits to add the partial products Pi·X. Accordingly, the parallel multiplier using Booth's algorithm has an advantage in that the amount of hardware necessary is less than that required by the multiplier using other algorithms. Thus, the parallel multiplier using Booth's algorithm is suitable for the realizing of a parallel multiplier of a large scale of 8×8 bits or more in a one-chip integrating circuit.

A circuit for adding (±X·Y+Z) or subtracting (±X·Y−Z) another data Z, which is expressed as the 2's complement, to or from the result of the multiplication X·Y or −X·Y, is known. FIGS. 1 and 2 show examples of the constitution of such a circuit. In FIG. 1, multiplier 1 receives the multiplicand X and multiplier Y, and obtains the product X·Y. The output of multiplier 1 is converted into −X·Y by 2's complement circuit 2. The output X·Y of multiplier 1 is selected by switch 3 which is controlled by a signal $\overline{OP}$. The output −X·Y of 2's complement circuit 2 is selected by switch 4 which is controlled by signal OP. The selected output X·Y or −X·Y is supplied to adding/subtracting circuit 5. The data Z is supplied to adding/subtracting circuit 5. Adding/subtracting circuit 5 performs the adding or subtracting operation on the basis of a control signal CON. In this manner, four types of product and sum calculations (±X·Y±Z) are selectively performed under the control of the signals OP, $\overline{OP}$, and CON.

On the other hand, in FIG. 2, the data Z is supplied to 2's complement circuit 2. Either one of the data Z and the output −Z of 2's complement circuit 2 is selected by switch 3, which is controlled by signal $\overline{OP}$, and switch 4 which is controlled by signal OP. The selected output is supplied to adding/subtracting circuit 5. Adding/subtracting circuit 5 adds or subtracts the output X·Y of multiplier 1 to or from data Z or −Z, on the basis of the foregoing control signals. In this manner, the four types of product sum calculations are selectively executed.

It is not desirable to use 2's complement circuit 2 in order to allow the four types of product and sum calculations to be selectively performed as mentioned above, due to the increase in the amount of hardware required. Moreover, the arithmetic operating time of 2's complement circuit 2 is long. In particular, if the parallel multiplication-type multiplier is used in order to achieve high-speed arithmetic operation, 2's complement circuit 2 is also constituted as the parallel type, so that the operating time of complement circuit 2 is long because the propagation time of the carry signal is long. If a carry look-ahead circuit is used to reduce the propagation time of the carry signal, the amount of hardware required once more increases considerably, resulting in a "vicious circle" situation.

The foregoing problems, notably the increase in the amount of hardware and the increase in the operation time also arise when the circuit for obtaining the negative product of −X·Y from the multiplicand X and multiplier Y is constituted by a multiplier for obtaining the product X·Y on the basis of Booth's secondary algorithm and a 2's complement circuit which receives the output of the multiplier as shown in FIGS. 1 and 2.

SUMMARY OF THE INVENTION

An object of the present invention to provide a parallel multiplier which can efficiently perform the negative product calculation at high speed, using only a small amount of hardware.

To accomplish the above object, a parallel multiplier according to the invention comprises:

$\overline{p_i}$ generating means (11) for receiving a multiplier Y and producing $\overline{p_i}$ therefrom (in which it is defined that $P_i = y_{2i}+y_{2i+1}-2\cdot y_{2i+2}$, $\overline{p_i} = \overline{y_{2i}+y_{2i+1}} - 2\cdot y_{2i+2}$, and $y_0 =$ "0", and $i=0, 1\ldots, (n-1)/2$, and $y_j$ is bit data of the jth bit of the multiplier Y);

partial-product generating means (21) for receiving the $\overline{p_i}$ from the $\overline{p_i}$ generating means (11) and the multiplicand X, and producing the partial products $\overline{p_i} \cdot X$ as the products of the multiplicand X and the $\overline{p_i}$; and partial-product adding means (21) for producing the negative produce $$\left( -X \cdot Y = \sum_{i=0}^{(n-1)/2} \overline{p_i} \cdot X \cdot 2^{2i} \right)$$

of the multiplicand X and multiplier Y, by weighting $2^{2i}$ to the partial products $\overline{pi} \cdot X$ from the partial-product producing means (21) and by adding the resultant data.

With the parallel multiplier having the above constitution according to the present invention, it is possible to obtain a parallel multiplier which can perform negative multiplication, using only a small amount of hardware in comparison to a conventional parallel multiplier. This is because the conventional pi generator and $\overline{pi}$ generator can be constituted so as to have an almost identical structure. Further, since the 2's complement circuit and the like are not used, the operating speed is almost equal to that of the conventional parallel multiplier. The function whereby the positive multiplication and negative multiplication can be selectively performed can be easily added as necessary.

BRIEF DESCRIPTION OF THE DRAWINGS

FIG. 4 is a block diagram showing an example of practical constitution of the parallel multiplier shown in FIG. 3;

DETAILED DESCRIPTION OF THE PREFERRED EMBODIMENTS

An embodiment of the present invention will be described in detail hereinbelow with reference to the drawings.

Figure 1:
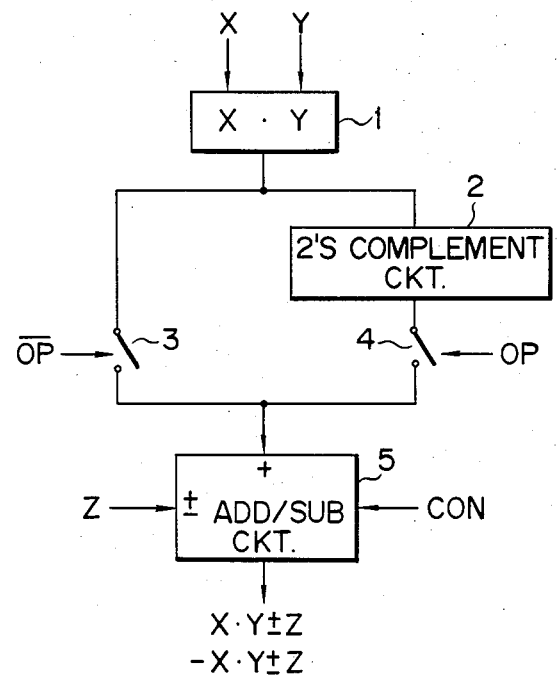
FIGS. 1 and 2 are block diagrams showing examples of constitutions of circuits for performing the product-/sum calculations.
Figure 2:
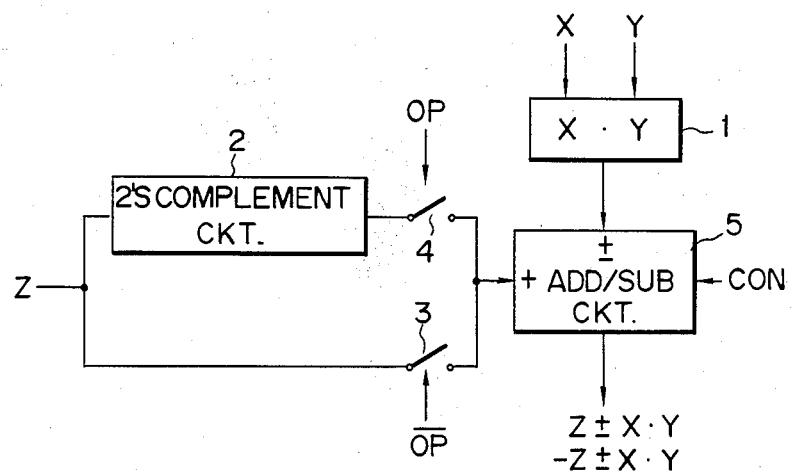
Figure 3:
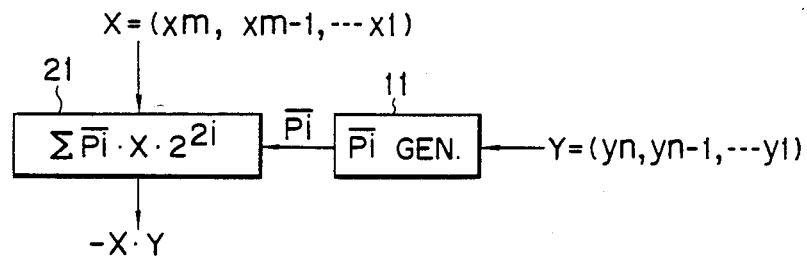
FIG. 3 is a block diagram showing a structure of a parallel multiplier according to the first embodiment of the present invention.

FIG. 3 shows a multiplier to obtain the product $-X \cdot Y$ for the inputs X and Y. This multiplier consists of $\overline{pi}$ generator 11 and partial product generating/adding circuit 21. $\overline{pi}$ generator 11 decodes the multiplier Y $(=yn, yn-1, \ldots, y1)$ and produces the $\overline{pi}$. Partial product generating/adding circuit 21 receives the $\overline{pi}$ and the multiplicand X $(=x_m, x_{m-1}, \ldots, x_1)$ and produces the partial products $(\overline{pi} \cdot X)$ on the basis of the Booth's algorithm and accumulates the partial products $(\Sigma \overline{pi} \cdot X \cdot 2^{2i})$. In this manner, the negative product $-X \cdot Y$ is obtained with respect to the inputs X and Y.

The above constitution is based on the following principle. As mentioned above, the equation (1) is satisfied.

$$X \cdot Y = \sum_{i=0}^{(n-1)/2} X \cdot p_i \cdot 2^{2i} \quad (1)$$

Therefore, the equation (2) is satisfied. By modifying the equation (2), the equation (3) is satisfied.

$$-X \cdot Y = -\sum_{i=0}^{(n-1)/2} X \cdot p_i \cdot 2^{2i} \quad (2)$$

$$= \sum_{i=0}^{(n-1)/2} X \cdot (-p_i) \cdot 2^{2i} \quad (3)$$

On the other hand, $-pi = \overline{pi}$ is satisfied. Thus, the equation (4) is satisfied.

$$-X \cdot Y = \sum_{i=0}^{(n-1)/2} X \cdot \overline{p_i} \cdot 2^{2i} \quad (4)$$

From the above equations, it will be understood that the negative product $-X \cdot Y$ is obtained by executing the following steps (1) to (3).

(1) $\overline{pi}$ generator 11 in FIG. 3 produces the $\overline{pi}$.

(2) Partial product generating/adding circuit 21 produces the partial products $\overline{pi} \cdot X$.

(3) Partial product generating/adding circuit 21 adds the partial products produced.

$$\left( \sum_{i=0}^{(n-1)/2} \overline{p_i} \cdot X \cdot 2^{2i} \right)$$

Therefore, in FIG. 3, a circuit to receive the multiplier Y and produce the $\overline{pi}$ is arranged in order to obtain the output of $-X \cdot Y$.

Practical examples of $\overline{pi}$ generator 11 and partial product producing/adding circuit 21 will now be described with reference to FIG. 4. FIG. 4 shows a constitution in the case of performing the multiplication of 8 bits×8 bits. In FIG. 4, $\overline{pi}$ generator 11 consists of decoders $DC_1$ to $DC_4$. Decoders $DC_1$ to $DC_4$ receive continuous three bits of the multiplier Y. On the other hand, circuit 21 is constituted by a plurality of sign cells S and a plurality of basic cells B which are arranged in a matrix form. Decoders $DC_1$ to $DC_4$ decode three continuous bits of the multiplier Y on the basis of the Booth's algorithm and produce the $\overline{pi}$ (selection signal SE in the actual circuit). Decoders $DC_1$ to $DC_4$ supply the produced $\overline{pi}$ to the cells of the corresponding row. When the $\overline{pi}$ is "−1" and "−2", decoders $DC_1$ to $DC_4$ supply a carry CA to the basic cells B of the lowest column in order to obtain the 2's complement of the partial products $\overline{pi} \cdot X$. Each basic cell receives the $\overline{pi}$ from corresponding decoders $DC_1$ to $DC_4$, carry C from the adjacent cell, bit data xj of the multiplicand X corresponding to that cell, and bit data xj-1 which is lower than the corresponding bit by one digit. It is assumed that x0=0. Each cell supplies the sum data S to the cell of the lower row of the same digit and supplies the carry C to the adjacent cell which is upper by one digit. The ordinarily known sign cells may be used. The problems of sign processes in the Booth's algorithm have been described in, for example, "DIGITAL CIRCUITS FOR BINARY ARITHMETIC", the Machmillan Press, Ltd., pages 156 and 157; therefore, its description is omitted here. In FIG. 4, partial product generating/adding circuit 21 has been constituted by a plurality of cells arranged in a matrix form. The invention is not limited to this. FIG. 4 shows an example of each circuit. For example, circuit 21 can be also constituted by a partial product generator consisting of the cells of one row in such a manner that the output of this generator is shifted and again supplied as the input data to the partial product generator and the partial products are sequentially weighted by $2^{2i}$ and then added. The arrangement of the cells, the supply of the carry and sum data, and the like are not limited to those shown in FIG. 4. For example, the Wallance Tree method, CSA method, or the like may be used.

The practical constitution of $\overline{pi}$ generator 11 will now be explained.

Figure 5A:
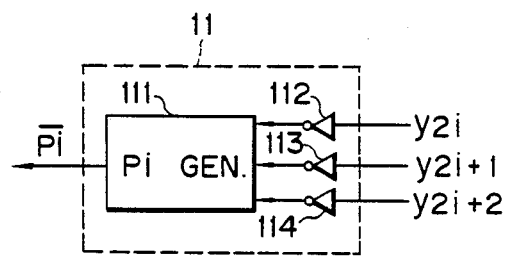
FIGS. 5A and 5B are block diagrams showing examples of constitutions of a $\overline{Pi}$ producing circuit shown in FIG. 3.
Figure 5B:
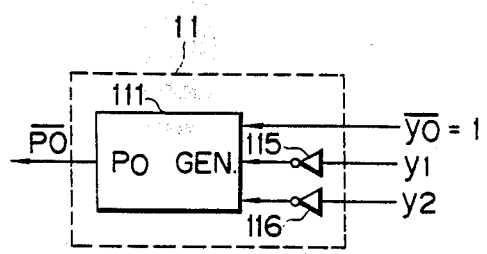

$\overline{pi}$ generator 11 shown in FIG. 5A comprises: ordinarily known circuit 111 to produce the pi; and inverters 112 to 114 to invert three bits y2i, y2i+1, and y2i+2 of the multiplier Y and supply the inverted data to circuit 111. $\overline{pi}$ generator 11 ($DC_1$) corresponding to i=0 sets the bit data y0 to the fixed value of "1" as shown in FIG. 5B. With such a constitution, by inputting the inverted data $\overline{y2i}$, $\overline{y2i+1}$, and $\overline{y2i+2}$ ordinarily known Pi generator 111, the $\overline{pi}$ is produced.

Figure 6:
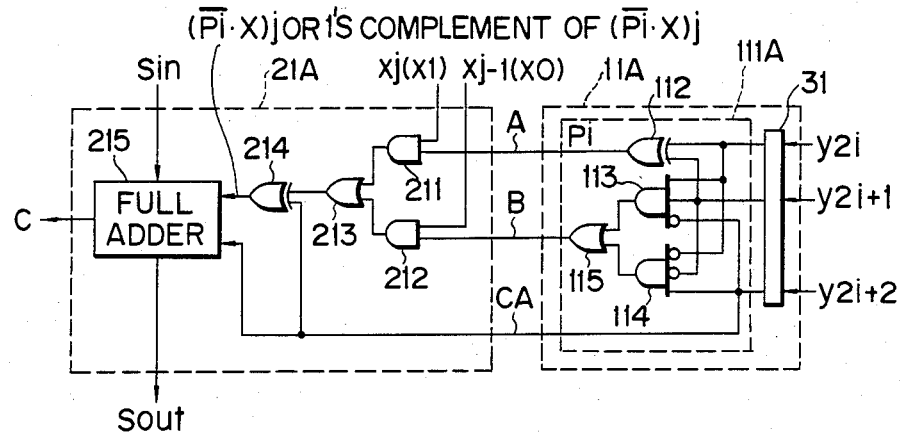
FIG. 6 is a circuit diagram showing practical a constitution of a $\overline{Pi}$ producing circuit for producing $\overline{Pi}$ by using a Pi producing circuit and a fundamental cell.

A practical example of the circuit to produce the $\overline{pi}$ by inverting the multiplier Y and supplying to the Pi generator as shown in FIGS. 5A and 5B will be described with reference to FIG. 6. FIG. 6 shows a part 11A of the $\overline{pi}$ generator and a part 21A of the partial product generating/adding circuit. Part 11A corresponds to one of the decoders in FIG. 4. Part 21A corresponds to the cells of the lowest column among the cells arranged in a matrix form in FIG. 4. In the constitution shown in FIG. 6, three continuous bits y2i, y2i+1, and y2i+2 of the multiplier Y are supplied to inverter 31. The data $\overline{y2i}$ from inverter 31 is supplied to exclusive OR gate (hereinafter, abbreviated as an EX OR gate) 112, AND gate 113, and an inverted input terminal of AND gate 114. The bit data $\overline{y2+1}$ from inverter 31 is supplied to EX OR gate 112, AND gate 113, and an inverted input terminal of AND gate 114. The bit data $\overline{y2i+2}$ from inverter 31 is supplied to the inverted input terminal of AND gate 113 and to AND gate 114. Further, the bit data $\overline{y2i+2}$ is supplied as a carry CA to cell 21A of the lowest column. The output of EX OR gate 112 is output as the selection signal A. The outputs of AND gates 113 and 114 are input to OR gate 115. The output of OR gate 115 is output as the selection signal B. The signal A from $\overline{pi}$ generator 11A is supplied to AND gate 211. The bit data xj (in this case, x1) of the multiplicand X is also input to AND gate 211. The signal B is supplied to AND gate 212. The bit data xj-1 (in this case, x0) is also supplied to AND gate 212. The output of AND gates 211 and 212 are supplied to OR gate 213. The output of OR gate 213 is input to EX OR gate 214. Further, the carry CA ($\overline{y2i+2}$) from generator 11A is supplied to EX OR gate 214. The output of EX OR gate 214 is set to one bit $(\overline{pi} \cdot X)j$ of the partial product or 1's complementary number of $(\overline{pi} \cdot X)j$. One bit $(\overline{pi} \cdot X)j$ of the partial product, the carry CA, and the sum data $S_{in}$ from the cells of the preceding row are supplied to full adder 215. Full adder 215 adds those input data and outputs the sum data $S_{out}$ and carry C. Namely, in FIG. 6, generator 11A outputs the signals A and B to instruct that partial product generating/adding circuit 21A produces the multiplicand X and data 2X or "0". Generator 11A outputs the signal CA to instruct that the produced data is inverted or directly output as the partial product and the partial product is converted to the 2's complement when the partial product becomes either one of the 1's complement of the multiplicand X, 1's complement of 2X, and 1's complement of "0". The truth table of the circuit shown in FIG. 6 is as shown in Table 1 and a desired partial product $\overline{pi} \cdot X$ is obtained.

TABLE 1

| y2i | y2i+1 | y2i+2 | A | B | CA | $\overline{p_i} \cdot X$ |
|---|---|---|---|---|---|---|
| 0 | 0 | 0 | 0 | 0 | 1 | 0 |
| 1 | 0 | 0 | 1 | 0 | 1 | −X |
| 0 | 1 | 0 | 1 | 0 | 1 | −X |
| 1 | 1 | 0 | 0 | 1 | 1 | −2X |
| 0 | 0 | 1 | 0 | 1 | 0 | 2X |
| 1 | 0 | 1 | 1 | 0 | 0 | X |
| 0 | 1 | 1 | 1 | 0 | 0 | X |
| 1 | 1 | 1 | 0 | 0 | 0 | 0 |

Figure 7:
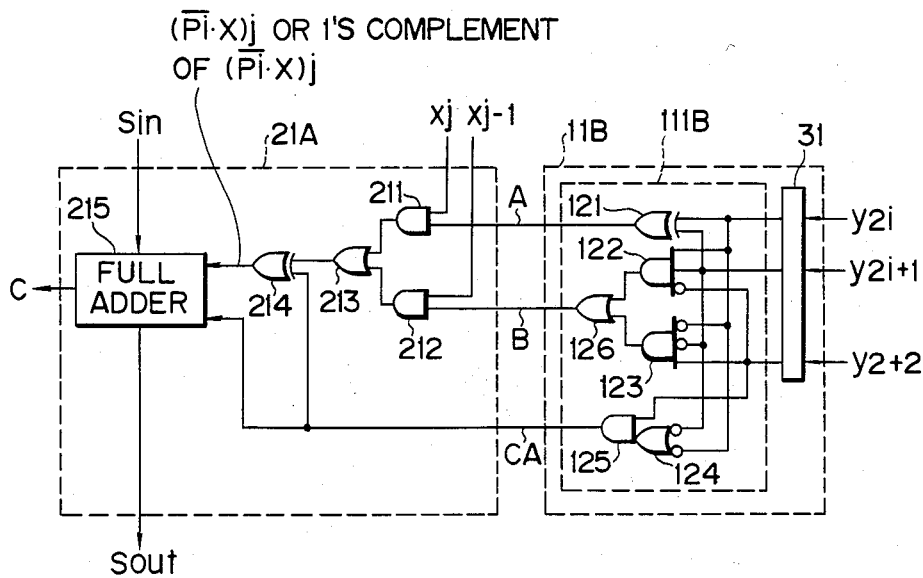
FIG. 7 is a circuit diagram showing an example of a modification of the $\overline{Pi}$ producing circuit shown in FIG. 6.
Figure 8:
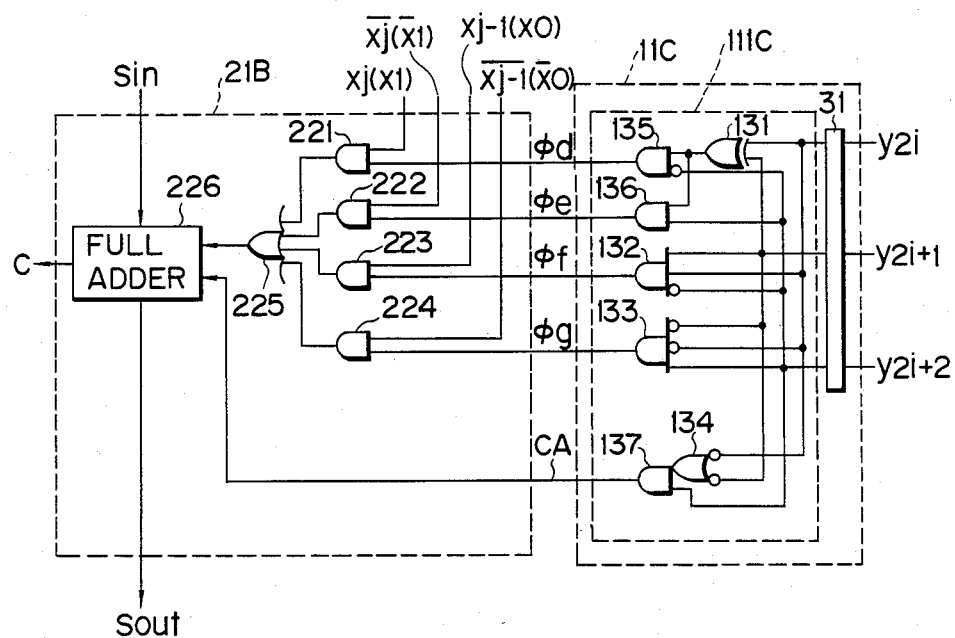
FIG. 8 is a circuit diagram showing another practical constitution of the $\overline{Pi}$ producing circuit and the fundamental cell.
Figure 9:
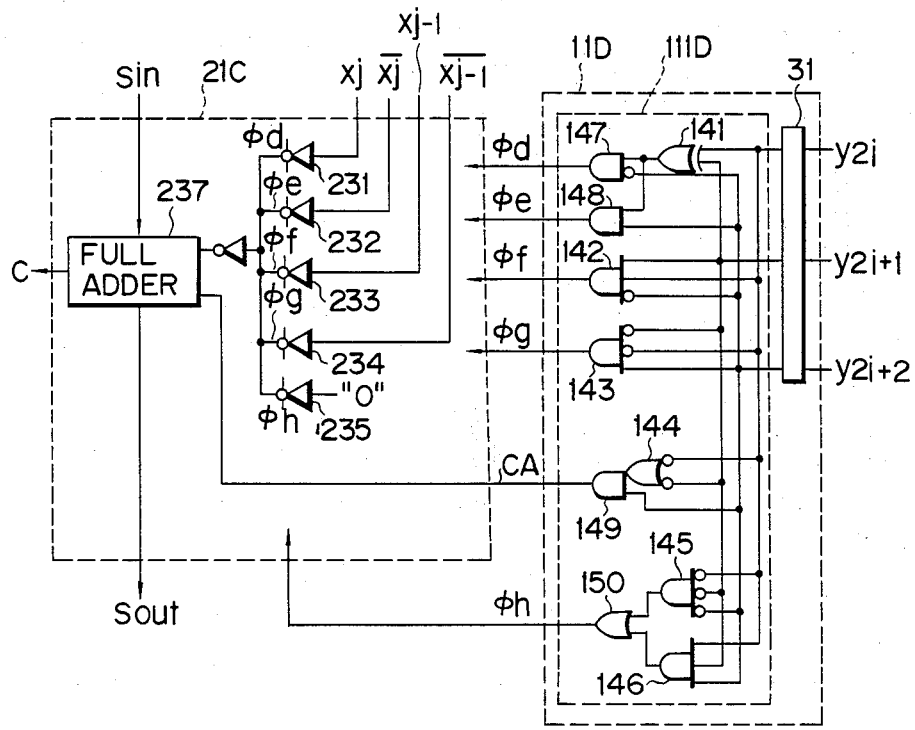
FIG. 9 is a circuit diagram showing examples of modifications of the $\overline{Pi}$ producing circuit and the fundamental cell shown in FIG. 8.

The circuits as shown in FIGS. 7 to 9 may be also used as $\overline{pi}$ generator 11 and partial product generating/adding circuit 21 (cell B). FIG. 7 shows a modified example 11B of $\overline{pi}$ generator 11A shown in FIG. 6. Therefore, only the structure of $\overline{pi}$ generator 11B will be explained. The bit data $\overline{y2i}$ from inverter 31 is input to EX OR gate 121, AND gate 122, and inverted input terminals of AND gate 123 and OR gate 124. The bit data $\overline{y2i+1}$ is input to EX OR gate 121, AND gate 122, and inverted input terminals of AND gate 123 and OR gate 124. The bit data $\overline{y2i+2}$ is input to the inverted input terminal of AND gate 122 and to AND gates 123 and 125. The output of OR gate 124 is input to AND gate 125. The outputs of AND gates 122 and 123 are input to OR gate 126. The output of EX OR gate 121 is set to the same signal as the control signal A. The output of OR gate 126 is set to the same signal as the control signal B. However, the carry CA which is output from AND gate 125 is not the same as the carry CA in FIG. 6. Namely, in the circuit of FIG. 6, when all of three bits of the multiplier Y are "0", the signal CA is also set to "1" in order to form the 2's complement from the 1's complement of "0". However, in FIG. 7, if all of three bits of the multiplier Y are "0", the carry CA is set to "0". However, there is no difference between the results of the arithmetic operations.

The structure of $\overline{pi}$ generator 11C in FIG. 8 will now be described. The bit data y2i from inverter 31 is input to EX OR gate 131, AND gate 132, and inverted input terminals of AND gate 133 and OR gate 134. The bit data $\overline{y2i+1}$ is input to EX OR gate 131, AND gate 132, and inverted input terminals of AND gate 133 and OR gate 134. The bit data $\overline{y2i+2}$ is input to inverted input terminals of AND gates 132 and 135 and to AND gates 133, 136, and 137. The output of EX OR gate 131 is input to AND gates 135 and 136. The output of OR gate 134 is input to AND gate 137. The structure of partial product generating/adding circuit 21B of FIG. 8 will now be described. The output $\phi d$ of AND gate 135 is supplied to AND gate 221. The bit data xj (in this case, x1) of the multiplicand X is also supplied to AND gate 221. The output $\phi e$ of AND gate 136 is supplied to AND gate 222. The bit data $\overline{xj}$ (in this case, $\overline{x1}$) is also supplied to AND gate 222. The output $\phi f$ of AND gate 132 is supplied to AND gate 223. The bit data xj-1 (in this case x0) of the multiplicand X is also supplied to AND gate 223. The output $\phi g$ of AND gate 133 is supplied to AND gate 224 The bit data $\overline{xj-1}$ (in this case, $\overline{x0}$) is also supplied to AND gate 224. The outputs of AND gates 221 to 224 are supplied to OR gate 225. Full adder 226 receives the carry CA which is output from AND gate 137, one bit $(\overline{pi}\cdot X)j$ of the partial product which is output from OR gate 225, and the sum data Sin from the cell of the preceding row. Full adder 226 then adds those input data and outputs the sum data $S_{out}$ an carry C. The truth table of the circuit shown in FIG. 8 is as shown in Table 2.

TABLE 2

| y2i | y2i+1 | y2i+2 | $\phi_d$ | $\phi_e$ | $\phi_f$ | $\phi_g$ | CA | $\overline{p_i} \# X$ |
|---|---|---|---|---|---|---|---|---|
| 0 | 0 | 0 | 0 | 0 | 0 | 0 | 0 | 0 |
| 1 | 0 | 0 | 0 | 1 | 0 | 0 | 1 | −X |
| 0 | 1 | 0 | 0 | 1 | 0 | 0 | 1 | −X |
| 1 | 1 | 0 | 0 | 0 | 0 | 1 | 1 | −2X |
| 0 | 0 | 1 | 0 | 0 | 1 | 0 | 0 | 2X |
| 1 | 0 | 1 | 1 | 0 | 0 | 0 | 0 | X |
| 0 | 1 | 1 | 1 | 0 | 0 | 0 | 0 | X |
| 1 | 1 | 1 | 0 | 0 | 0 | 0 | 0 | 0 |

FIG. 9 shows a modified example of FIG. 8. First, the structure of generator 11D will be explained. The bit data $\overline{y2i}$ from inverter 31 is input to EX OR gate 141, AND gates 142 and 146, and inverted input terminals of AND gates 143 and 145 and OR gate 144. The bit data $\overline{y2i+1}$ is input to EX OR gate 141, AND gate 142, inverted input terminals of AND gates 143 and 145, an inverted input terminal of OR gate 144, and AND gate 146. The bit data $\overline{y2i+2}$ is input to inverted input terminals of AND gates 142 and 147 and to AND gates 143, 148, and 149. The output of EX OR gate 141 is input to AND gates 147 and 148. The output of OR gate 144 is input to AND gate 149. The outputs of AND gates 145 and 146 are supplied to OR gate 150. The structure of generating/adding circuit 21C will now be described. The output $\phi d$ of AND gate 147 is supplied to a control terminal of three state inverter 231. The bit data xj (in this case x1) of the multiplicand X is input to inverter 231. The output $\phi e$ of AND gate 148 is supplied to a control terminal of three-state inverter 232. The bit data xj (in this case, $\overline{x1}$) is input to inverter 232. The output $\phi f$ of AND gate 142 is supplied to a control terminal of three-state inverter 233. The bit data xj-1 (in this case, x0) of the multiplicand X is input to inverter 233. The output $\phi g$ of AND gate 143 is supplied to a control terminal of inverter 234. The bit data $\overline{xj-1}$ (in this case, $\overline{x0}$) is input to inverter 234. The outputs $\phi h$ of OR gate 150 is supplied to a control terminal of inverter 235. The data "0" is input to inverter 235. The wired-OR is calculated from the outputs of inverters 231 to 235 and supplied to inverter 236. The output of inverter 236 is set to one bit $(\overline{pi}\cdot X)j$ of the partial product. One bit $(\overline{pi}\cdot X)j$ of the partial product, carry CA, and sum data $S_{in}$ are supplied to full adder 237. Full adder 237 adds those input data and outputs the sum data $S_{out}$ and carry C. The truth table of the circuit shown in FIG. 9 is as shown in Table 3. A desired partial product $\overline{pi}.X$ is derived.

TABLE 3

| y2i | y2i+1 | y2i+2 | $\phi_d$ | $\phi_e$ | $\phi_f$ | $\phi_g$ | $\phi_h$ | CA | $\overline{p_i} \cdot X$ |
|---|---|---|---|---|---|---|---|---|---|
| 0 | 0 | 0 | 0 | 0 | 0 | 0 | 1 | 0 | 0 |
| 1 | 0 | 0 | 0 | 1 | 0 | 0 | 0 | 1 | −X |
| 0 | 1 | 0 | 0 | 1 | 0 | 0 | 0 | 1 | −X |
| 1 | 1 | 0 | 0 | 0 | 0 | 1 | 0 | 1 | −2X |
| 0 | 0 | 1 | 0 | 0 | 1 | 0 | 0 | 0 | 2X |
| 1 | 0 | 1 | 1 | 0 | 0 | 0 | 0 | 0 | X |
| 0 | 1 | 1 | 1 | 0 | 0 | 0 | 0 | 0 | X |
| 1 | 1 | 1 | 0 | 0 | 0 | 0 | 1 | 0 | 0 |

The constitutions of pi generators 111A to 111D and partial product generating/adding circuit 21A to 21C are not limited to those shown in FIGS. 6 to 9. The conventionally known constitution is used.

Foregoing $\overline{pi}$ generator 11 obtains the $\overline{pi}$ by operating the multiplier Y. However, the invention is not limited to this method but may use a unique constitution as the $\overline{pi}$ generator. An embodiment with such a constitution will be described with reference to FIGS. 10 and 11.

Figure 10:
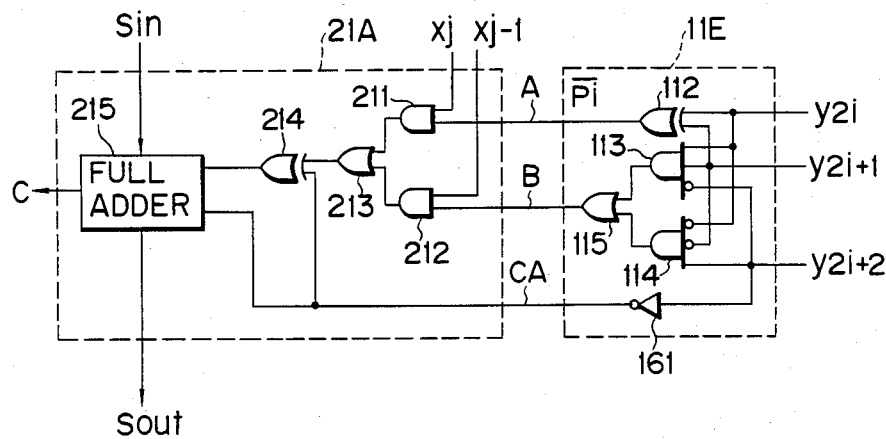
FIG. 10 is a circuit diagram showing an example of a constitution of a $\overline{Pi}$ producing circuit including no Pi producing circuits, which is a modification of the $\overline{Pi}$ producing circuit shown in FIG. 6.

$\overline{pi}$ generator 11E shown in FIG. 10 is obtained by modifying pi generator 111A shown in FIG. 6. $\overline{pi}$ generator 11E differs from pi generator 111A with respect to the point that the bit data y2i+2 is inverted by inverter and output as the carry CA. The constitution of partial product generating/adding circuit 21A is the same as the constitution shown in FIG. 6. Circuit 21A also operates in accordance with the truth table shown in Table 1 and the partial product $(\overline{pi}\cdot X)j$ is derived. This partial product, carry CA, and sum data Sin from the preceding row are added by full adder 215 and the carry C and sum data $S_{out}$ are output.

Figure 11:
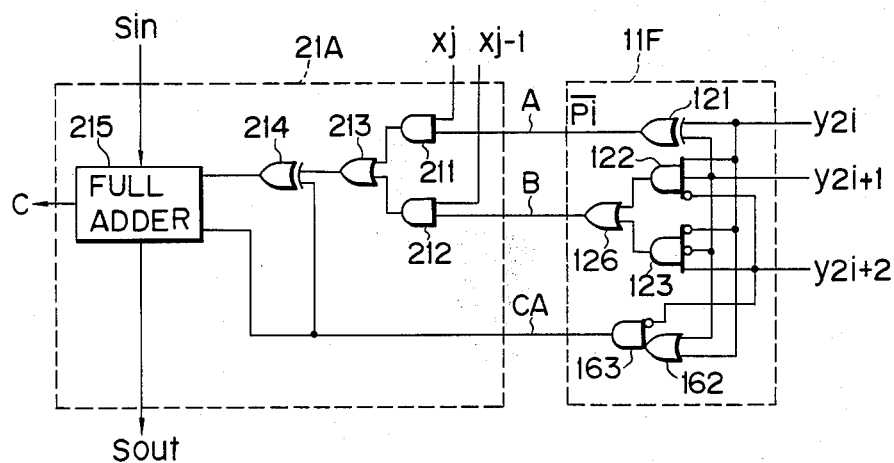
FIG. 11 is a circuit diagram showing an example of a modification of the $\overline{Pi}$ producing circuit shown in FIG. 10.

It is a feature of the circuit shown in FIG. 11 that OR gate 162 and AND gate 163 are used in place of inverter 161 in $\overline{Pi}$ generator 11E shown in FIG. 10. OR gate 162 receives the bit data y2i and y2i+1. AND gate 163 receives the output of OR gate 162. The bit data y2i+2 is set to the inverted input.

Figure 12:
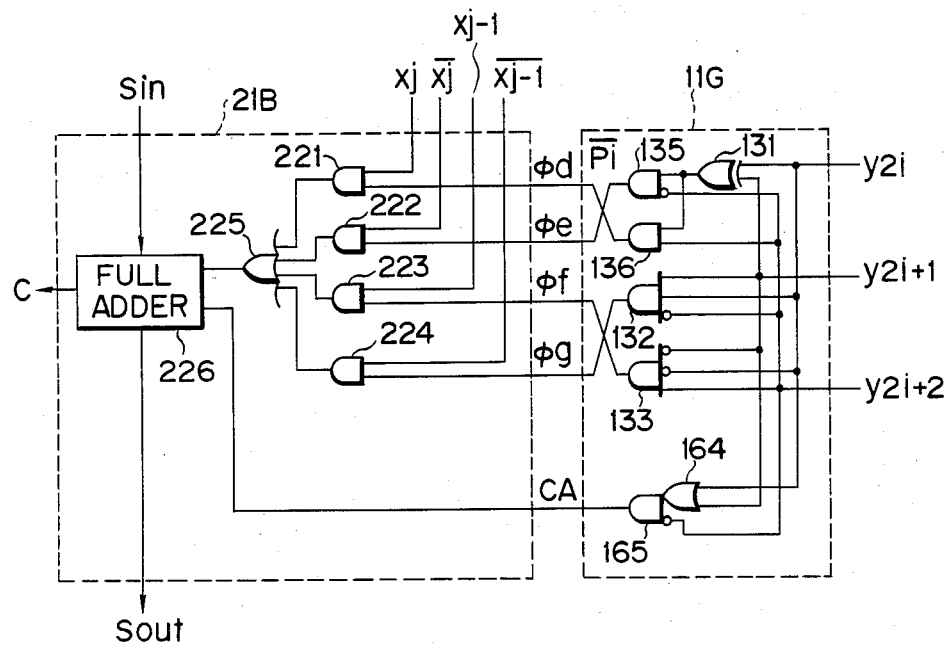
FIG. 12 is a circuit diagram showing an example of a constitution of a $\overline{Pi}$ producing circuit including no Pi producing circuits, which is a modification of the $\overline{Pi}$ producing circuit shown in FIG. 8.

On the other hand, $\overline{pi}$ generator 11G shown in FIG. 12 is constituted by modifying pi generator 111C shown in FIG. 8. Generator 11G has the following features.

(1) The output of AND gate 135 is supplied as the signal $\phi e$ to AND gate 222. The output of AND gate 136 is supplied as the signal $\phi d$ to AND gate 221. The output of AND gate 132 is supplied as the signal $\phi g$ to AND gate 224. The output of AND gate 133 is supplied as the signal $\phi f$ to AND gate 223.

(2) The carry CA is set to "1" when either the signal $\phi e$ or the signal $\phi g$ is set to "1".

These features will be explained hereinbelow by use of the practical circuit constitution.

(1) The signals φd and φe in FIG. 8 are exchanged and the signals φf and φg are exchanged.

(2) OR gate 134 is changed to OR gate 164 having no inverted input terminal. AND gate 137 is replaced by AND gate 165 which receives the output of OR gate 164 and the bit data y2i+2 as the inverted input.

Figure 13:
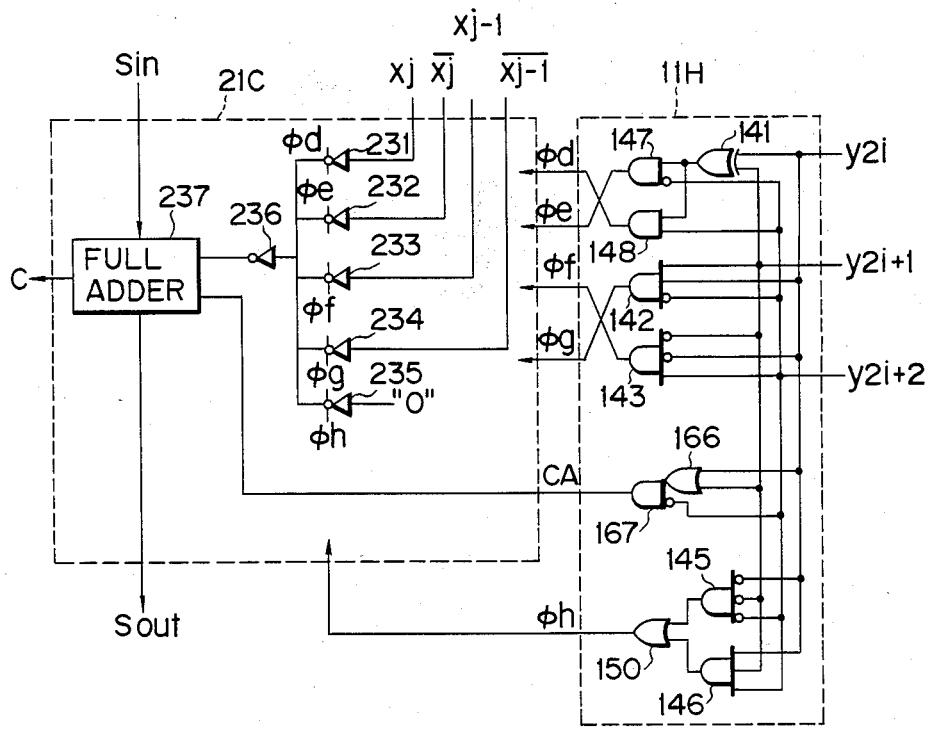
FIG. 13 is a circuit diagram showing an example of a constitution of a $\overline{Pi}$ producing circuit including no Pi producing circuits, which is a modification of the $\overline{Pi}$ producing circuit shown in FIG. 9.

$\overline{pi}$ generator 11H shown in FIG. 13 is formed by changing the structure of pi generator 111D in FIG. 9. As compared with pi generator 111D, generator 11H has the following features.

(1) The output of AND gate 147 is supplied as the signal φe to a control terminal of inverter 232. The output of AND gate 148 is supplied as the signal φd to a control terminal of inverter 231. The output of AND gate 143 is supplied as the signal φf to a control terminal of inverter 233. The output of AND gate 142 is supplied as the signal φg to a control terminal of inverter 234. (The outputs φd and φe in FIG. 9 are exchanged and the outputs φf and φg are exchanged).

(2) OR gate 166 is used in place of OR gate 144 having two inverted input terminals. AND gate 167 which receives the output of OR gate 166 and the bit data y2i+2 as the inverted input is used in place of AND gate 149. (The carry CA is set to "1" when either the output φe or the output φg is set to "1".

The generator shown in FIG. 13 obtains the negative product −X·Y in accordance with a truth table shown in Table 3.

Figure 14:
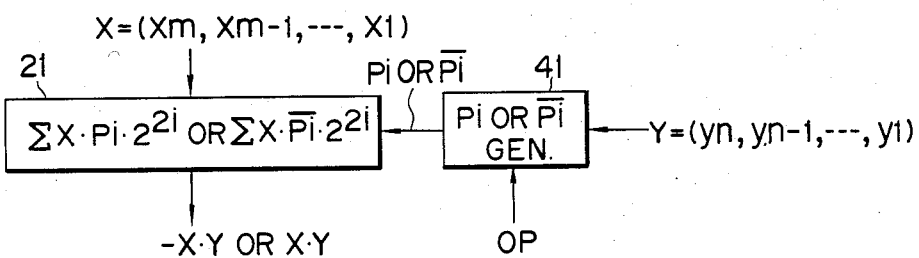
FIG. 14 is a block diagram showing a constitution of a parallel multiplier according to a second embodiment of the present invention.

As an example of application of the present invention, an explanation will be made with respect to a multiplier of the positive/negative switching type which can selectively obtain the negative multiplication output (−X·Y) or positive multiplication output (X·Y). FIG. 14 shows a conceptional constitution of such a circuit. The circuit shown in FIG. 14 comprises pi or $\overline{pi}$ generator 41 and partial product generating/adding circuit 21. pi or $\overline{pi}$ generator 41 selectively produces the pi or $\overline{pi}$ from the multiplier Y in accordance with the logic level of the control signal OP. Partial product generating/adding circuit 21 produces the partial products of the multiplicand X and the pi or $\overline{pi}$ from generator 41 and adds them. Circuit 21 may have the same constitution as circuit 21 in FIG. 3.

Figure 15A:
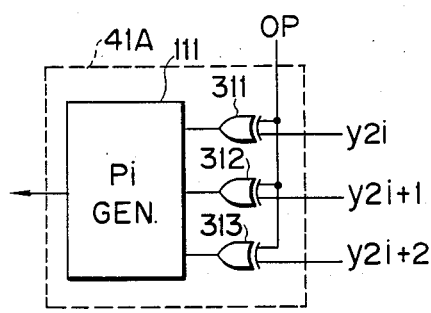
FIGS. 15A and 15B are block diagrams showing constitutions of the Pi or $\overline{Pi}$ producing circuit shown in FIG. 14.
Figure 15B:
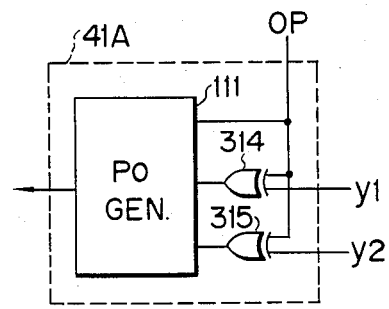
Figure 16:
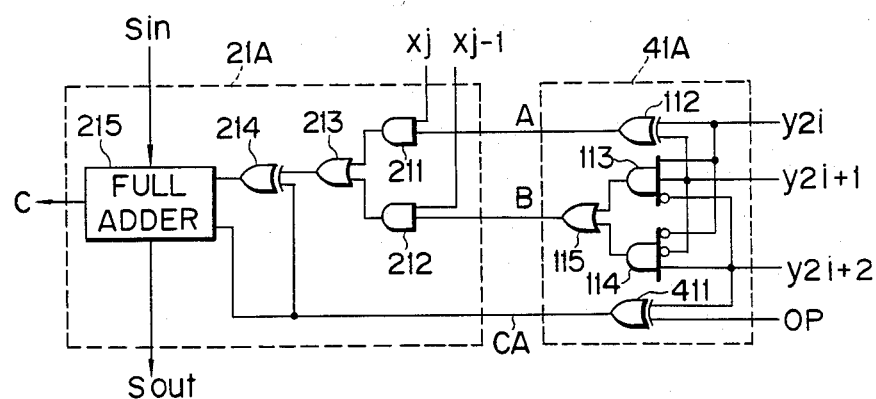
FIG. 16 is a circuit diagram showing an example of a practical constitution of a Pi or $\overline{Pi}$ producing circuit and a fundamental cell of the parallel multiplier shown in FIG. 14.

An embodiment of foregoing pi or $\overline{pi}$ generator 41 will now be described. pi or $\overline{pi}$ generator 41 shown in FIG. 15A uses EX OR gates 311 to 313 in place of inverters 112 to 114 in $\overline{pi}$ generators 11 in FIGS. 5A and 5B. EX OR gates 311 to 313 receive at one end the bit data y2i, y2i+1, and y2i+2 and receive at the other end the control signal OP. Therefore, the bit data y2i, y2i+1, and y2i+2 are directly input to pi generator 111 or inverted and input thereto in accordance with the level "0" or "1" of the control signal OP. Therefore, the output of circuit 41 is set to the pi or $\overline{pi}$ on the basis of whether the level of the signal OP is "0" or "1". In this case, p0 or $\overline{p0}$ generator corresponding to i=0 can directly use the signal OP as the y0 input as shown in FIG. 15B. Therefore, pi or $\overline{pi}$ generator is obtained by using EX OR gates instead of inverter 31 in FIGS. 6 to 9.

pi or $\overline{pi}$ generator 41A in FIG. 16 uses EX OR gate 411 which receives the bit data y2i+2 and control signal OP in place of inverter 161 in $\overline{pi}$ generator 11E in FIG. 10. Therefore, when the level of the signal OP is set to "1", generator 41A and partial product generating. adding circuit 21A operate in accordance with Table 1 and one bit ($\overline{pi}$·X)j of the partial product is obtained. Thus, the negative product −X·Y is derived.

When the level of the signal OP is set to "0", generator 41A and circuit 21A operate in accordance with Table 4 and one bit (pi·X)j of the partial product is obtained. Thus, the positive product X·Y is obtained.

TABLE 4

Figure 17:
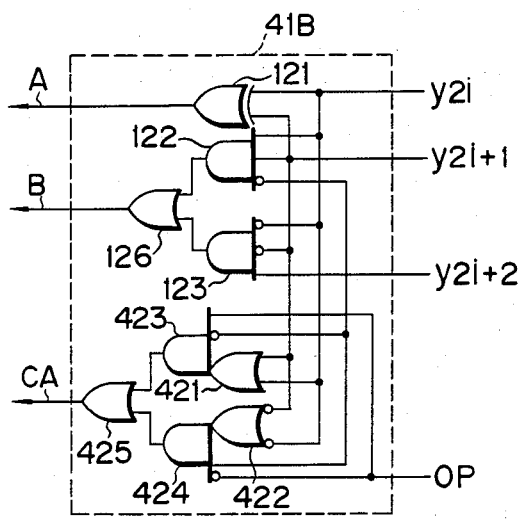
FIG. 17 is a circuit diagram showing a constitution of a Pi or $\overline{Pi}$ producing circuit formed by modifying the $\overline{Pi}$ producing circuit shown in FIG. 11.

| y2i | y2i+1 | y2i+2 | A | B | CA | p$_i$·X |
|-----|-------|-------|---|---|----|---------|
| 0 | 0 | 0 | 0 | 0 | 0 | 0 |
| 1 | 0 | 0 | 1 | 0 | 0 | X |
| 0 | 1 | 0 | 1 | 0 | 0 | X |
| 1 | 1 | 0 | 0 | 1 | 0 | 2X |
| 0 | 0 | 1 | 0 | 1 | 1 | −2X |
| 1 | 0 | 1 | 1 | 0 | 1 | −X |
| 0 | 1 | 1 | 1 | 0 | 1 | −X |
| 1 | 1 | 1 | 0 | 0 | 1 | 0 | pi or $\overline{pi}$ generator 41B shown in FIG. 17 is constituted by modifying $\overline{pi}$ generator 11F in FIG. 11. As compared with generator 11F, generator 41B has such a feature that the carry CA is set to the level as shown in Table 4 or 5 in accordance with the level "0" or "1" of the signal OP. Practically speaking, OR gates 421, 422, and 425 and AND gates 423 and 424 are used in place of OR gate 162 and AND gate 163 in generator 11F.

TABLE 5

Figure 18:
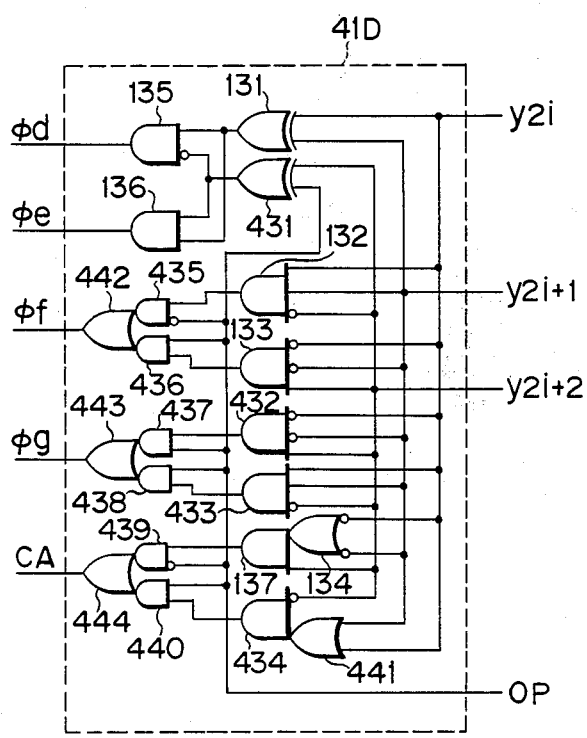
FIG. 18 is a circuit diagram showing a constitution of a Pi or $\overline{Pi}$ producing circuit formed by modifying $\overline{Pi}$ producing circuit shown in FIG. 8.

| y2i | y2i+1 | y2i+2 | A | B | CA | $\overline{p_i}$·X |
|-----|-------|-------|---|---|----|---------|
| 0 | 0 | 0 | 0 | 0 | 0 | 0 |
| 1 | 0 | 0 | 1 | 0 | 1 | −X |
| 0 | 1 | 0 | 1 | 0 | 1 | −X |
| 1 | 1 | 0 | 0 | 1 | 1 | −2X |
| 0 | 0 | 1 | 0 | 1 | 0 | 2X |
| 1 | 0 | 1 | 1 | 0 | 0 | X |
| 0 | 1 | 1 | 1 | 0 | 0 | X |
| 1 | 1 | 1 | 0 | 0 | 0 | 0 | pi or $\overline{pi}$ generator 41D can be constituted by modifying $\overline{pi}$ generator 11C shown in FIG. 8 as shown in FIG. 18. When the signal OP is set to the "0" level, generator 41D operates in accordance with Table 6. When the signal OP is set to the "1" level, generator 41D operates in accordance with Table 3. Namely, on the basis of the level of the signal OP, the signals φd and φe are exchanged and the signals φf and φg are exchanged and the level of the carry CA is inverted. Generator 41D is constituted by adding EX OR gate 431, AND gates 432 to 440, and OR gates 441 to 444 to generator 11G shown in FIG. 12.

TABLE 6

| y2i | y2i+1 | y2i+2 | φ$_d$ | φ$_e$ | φ$_f$ | φ$_g$ | CA | p$_i$·X |
|-----|-------|-------|-------|-------|-------|-------|----|---------|
| 0 | 0 | 0 | 0 | 0 | 0 | 0 | 0 | 0 |
| 1 | 0 | 0 | 1 | 0 | 0 | 0 | 0 | X |
| 0 | 1 | 0 | 1 | 0 | 0 | 0 | 0 | X |
| 1 | 1 | 0 | 0 | 0 | 1 | 0 | 0 | 2X |
| 0 | 0 | 1 | 0 | 0 | 0 | 1 | 1 | −2X |
| 1 | 0 | 1 | 0 | 1 | 0 | 0 | 1 | −X |
| 0 | 1 | 1 | 0 | 1 | 0 | 0 | 1 | −X |
| 1 | 1 | 1 | 0 | 0 | 0 | 0 | 0 | 0 |

Similarly, $\overline{pi}$ generator 11H shown in FIG. 13 can be also changed to pi or $\overline{pi}$ generator. In this case, the generator operates as shown in Table 3 or 7.

TABLE 7

| y2i | y2i+1 | y2i+2 | φ$_d$ | φ$_e$ | φ$_f$ | φ$_g$ | φ$_h$ | CA | p$_i$·X |
|-----|-------|-------|-------|-------|-------|-------|-------|----|---------|
| 0 | 0 | 0 | 0 | 0 | 0 | 0 | 1 | 0 | 0 |
| 1 | 0 | 0 | 1 | 0 | 0 | 0 | 0 | 0 | X |
| 0 | 1 | 0 | 1 | 0 | 0 | 0 | 0 | 0 | X |
| 1 | 1 | 0 | 0 | 0 | 1 | 0 | 0 | 0 | 2X |
| 0 | 0 | 1 | 0 | 0 | 0 | 1 | 0 | 1 | −2X |
| 1 | 0 | 1 | 0 | 1 | 0 | 0 | 0 | 1 | −X |

TABLE 7-continued

| $y_{2i}$ | $y_{2i+1}$ | $y_{2i+2}$ | $\phi_d$ | $\phi_e$ | $\phi_f$ | $\phi_g$ | $\phi_h$ | CA | $\overline{p_i} \cdot X$ |
|---|---|---|---|---|---|---|---|---|---|
| 0 | 1 | 1 | 0 | 1 | 0 | 0 | 0 | 1 | $-X$ |
| 1 | 1 | 1 | 0 | 0 | 0 | 0 | 1 | 0 | 0 |

Figure 19:
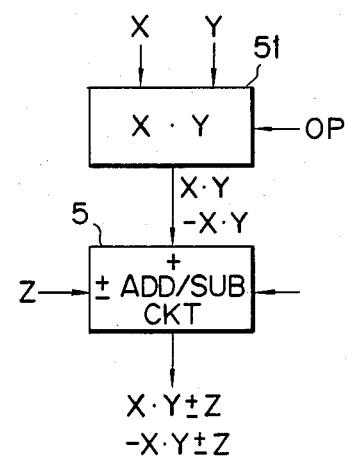
FIG. 19 is a block diagram showing an example of a circuit to which the parallel multiplier shown in FIG. 14 is applied.

With the foregoing multiplier of the positive/negative switching type, it is possible to constitute the product sum circuit for selectively performing four kinds of calculations of $\pm X \cdot Y \pm Z$ between the output ($X \cdot Y$ or $-X \cdot Y$) of the multiplier and another data Z which is expressed as a 2's complement. FIG. 19 shows an example of such a circuit. In FIG. 19, adding/subtracting circuit 5 receives the data from multiplier 51 of the positive/negative switching type and the data Z and adds or subtracts the data Z to or from the output data of multiplier 51.

As described above, with the parallel multiplier according to the invention, the negative product ($-X \cdot Y$) of the multiplicand data X and the multiplier data Y is obtained by merely slightly changing the ordinary multiplying decoder in the parallel multiplier to which the secondary Booth's algorithm was applied. Therefore, as compared with the constitution of the conventional circuit to obtain the negative product, the circuit of 2's complement is not used. Therefore, the amount of hardware is little and the problems such that the high speed operation is obstructed due to the propagation of the carry and the like are not caused. Moreover, the number of circuits which are added when the multiplying decoder is modified is very small as shown in each of the foregoing embodiments. The delay time of the operation which is caused by adding the circuits is up to the time corresponding to only a few gates and is very small as compared with the delay time of the operation which is caused by the carry propagation of the circuit of 2's complement.

According to the invention, the circuit can be easily changed so as to selectively obtain the positive product ($X \cdot Y$) or negative product ($-X \cdot Y$) in response to the control signal. In this case, the number of circuits which are added is small as mentioned above and there is such an advantage that the delay time of the operation is small. Moreover, by combining the adding/subtracting circuit to the parallel multiplier according to the invention, four kinds of calculations ($\pm X \cdot Y \pm Z$) can be selectively easily executed between the input data and another input data Z. The flexibility in digital signal process can be increased.

In the foregoing embodiments, the $\overline{p_i}$ was produced and the negative product $-X \cdot Y$ was obtained on the basis of the $\overline{p_i}$ for convenience of explanation. However, as mentioned above, $-p_i = \overline{p_i}$. Therefore, the embodiments can be also considered such that $-p_i$ is produced and then the partial product is obtained.

On the other hand, the circuit diagrams shown in the diagrams are nothing but the examples. The invention is not limited to only those circuits.

What is claimed is:

1. An arithmetic operation circuit having a multiplier comprising:

$\overline{p_i}$ generating means for receiving a multiplier Y and for generating $\overline{p_i}$ (in which it is defined that $p_i = y_{2i} + y_{2i+1} - 2 \cdot y_{2i+2}$,
$\overline{p_i} = \overline{y_{2i} + y_{2i+1} - 2 \cdot y_{2i+2}}$, and $y_0 = 0$, and $i = 0, 1, \ldots, (n-1)/2$, and yj is data of a jth bit of the multiplier Y);

partial-product generating means for receiving the $\overline{p_i}$ from said $\overline{p_i}$ generating means, and a multiplicand X, and producing partial products $\overline{p_i} \cdot X$; and partial-product adding means for producing a negative product ($-X \cdot Y = \Sigma \overline{p_i} \cdot X \cdot 2^{2i}$) of the multiplicand X and the multiplier Y, by weighting $2^{2i}$ to the partial products $\overline{p_i} \cdot X$ and by adding the resultant data.

2. An arithmetic operation circuit having a multiplier according to claim 1, wherein said $\overline{p_i}$ generating means comprises:

Pi generating means for outputting the pi when said multiplier Y is input; and inverting means for receiving the multiplier Y and supplying the inverted data of the multiplier $\overline{Y}$ to said pi generating means, thereby allowing the $\overline{p_i}$ to be produced by said pi generating means.

3. An arithmetic operation circuit having a multiplier according to claim 2, wherein said inverting means includes means for receiving a control signal and for supplying said multiple Y, as it is, to said pi generating means in response to said control signal.

4. An arithmetic operation circuit having a multiplier according to claim 1, wherein said $\overline{p_i}$ generating means is a circuit which outputs signals to instruct said partial-product generating means to selectively produce the multiplicand X, the data $2 \cdot X$ which is twice the multiplicand X, and "0", and which outputs signals to instruct said partial product generating means to output the produced data as they are, or inverts them and outputs the inverted data as the partial products, and converts one or more partial products into 2's complement, in the case where one or more partial products are the 1's complement of the multiplicand X, 1's complement of $2 \cdot X$, and 1's complement of "0".

5. An arithmetic operation circuit having a multiplier according to claim 4, wherein said $\overline{p_i}$ generating means further has means for receiving a control signal, for inverting the signals which instruct the inversion and the conversion into the 2's complement, and for outputting the inverted signal or directly outputting the signal on the basis of said control signal.

6. An arithmetic operation circuit having a multiplier according to claim 1, wherein said $\overline{p_i}$ generating means is a circuit which outputs signals to instruct said partial product generating means to selectively produce the multiplicand X, the data $2 \cdot X$ which is twice the multiplicand X, and "0", and which outputs signals to instruct said partial-product generating means to output the produced data as they are, or inverts them and outputs the inverted data as the partial products, and converts one or more partial products into the 2's complement, in the case where said one or more partial products, are the 1's complement of the multiplicand X and 1's complement of $2 \cdot X$.

7. An arithmetic operation circuit having a multiplier according to claim 6, wherein said $\overline{p_i}$ generating means further has means for receiving a control signal, for inverting signals which, instruct the inversion and the conversion into the 2's complement, and for outputting the inverted signal or directly outputting said signal on the basis of said control signal.

8. An arithmetic operation circuit having a multiplier according to claim 1, wherein said $\overline{p_i}$ generating means is a circuit which outputs signals to instruct said partial-product generating means to selectively produce, as the partial products, the multiplicand x, the data 2·x which is twice the multiplicand x, the inverted data $\overline{X}$ of the multiplicand X, the inverted data $\overline{2 \cdot X}$ of the data 2·X, and "0", and which outputs signals to instruct said partial-product generating means to convert one or more partial products into the 2's complement, in the case where said one or more partial products are the 1's complement of the multiplicand X, 1's complement of 2·X, and 1's complement of "0".

9. An arithmetic operation circuit having a multiplier according to claim 8, wherein said $\overline{pi}$ generating means further has:
   means for receiving a control signal, switching, upon receipt of the control signal, the signal for instructing the production of said multiplicand X and the signal for instructing the production of the data $\overline{X}$, and switching, also upon receipt of the control signal, the signal for instructing the production of the data 2·X and the signal for instructing the production of the data $\overline{2 \cdot X}$; and
   means for receiving the control signal, for inverting the signal which instructs the inversion and conversion into the 2's complement, and for outputting the inverted signal or directly outputting the signal on the basis of the control signal.

10. An arithmetic operation circuit having a multiplier according to claim 1, wherein said $\overline{pi}$ generating means is a circuit which outputs signals to instruct said partial-product generating means to selectively produce, as the partial products, the multiplicand x, the data 2·X which is twice the multiplicand X, the inverted data $\overline{X}$ of the multiplicand X, the inverted data $\overline{2 \cdot X}$ of the data 2·X, and "0", and which outputs signals to instruct said partial-product generating means to convert one or more partial products into the 2's complement, in the case where said one or more partial products are the 1's complement of the multiplicand X and 1's complement of 2·X.

11. An arithmetic operator circuit having a multiplier according to claim 10, wherein said $\overline{pi}$ generating means further has:
   means for receiving a control signal, switching, upon receipt of the control signal, the signal for instructing the production of said multiplicand X and the signal for instructing the production of the data $\overline{X}$, and switching, also upon receipt of the control signal, the signal for instructing the production of the data 2·X and the signal for instructing the production of the data $\overline{2 \cdot X}$; and
   means for receiving the control signal, for inverting the signal which instructs the inversion and conversion into the 2's complement, and for outputting the inverted signal or directly outputting the signal on the basis of the control signal.

12. An arithmetic operation circuit having a multiplier according to claim 1, wherein said $\overline{pi}$ generating means includes Pi generating means for receiving a control signal and producing the pi on the basis of said control signal, and
   wherein said partial-product generating means includes means for producing the partial products X·pi,
   for adding the partial products X·pi, and for obtaining the positive product of said multiplicand X and said multiplier Y when said pi generating means outputs the pi.

13. An arithmetic operation circuit having a multiplier according to claim 1, including means for receiving the output of said partial-product adding means, data X, and an addition control signal, and for adding the data Z to or subtracting it from the output of said adding means, in response to the level of said addition control signal.

14. An arithmetic operation having a multiplier according to claim 13, wherein said $\overline{pi}$ generating means includes pi generating means for producing said pi,
   said partial-product generating means and said partial-product adding means includes means for selectively obtaining one of the positive product (X·Y) and the negative product (−X·Y) of said multiplicand X and said multiplier Y, in response to the output of said pi generating means and said pi generating means respectively,
   and wherein said adding/subtracting means adds or subtracts the data Z to or from the output of said partial-product adding means.

15. An arithmetic operation circuit having a multiplier according to claim 1, wherein said multiplicand X and said multiplier Y are the data which are expressed as the 2's complement.

16. An arithmetic operation circuit having a multiplier according to claim 1, wherein said $\overline{pi}$ generating means is constituted by a decoder which consists of a plurality of logic gates, each of which receives three continuous bits of said multiplier Y, and which outputs the signals corresponding to said $\overline{pi}$,
   said partial product generating means and said partial-product adding means are constituted by a plurality of multiplying cells arranged in a matrix form, and
   each of said multiplying cells is constituted by a logic circuit for receiving the signals corresponding to said $\overline{pi}$, from the corresponding decoder, and corresponding bits data of the multiplicand, and for obtaining one bit (X·$\overline{pi}$)j of said partial products, and a full adder for adding one bit of the partial products, a carry from the adjacent multiplying cell, and the sum data from the multiplying cells at the form stage, and for outputting the sum data and the carry.

17. A multiplier for obtaining the negative product of data X and Y, comprising:
   decoding means for receiving and decoding the multiplier Y, and producing $\overline{pi}$ (in which, it is defined that pi=y2+y2i+1−2y2i+2, $\overline{pi}=\overline{y2i}+\overline{y2i+1}--2\cdot\overline{y2i+2}$, Y0=0, and i=0, 1, ..., (n−1)/2, and yj is a jth bit of data Y); and
   obtaining means for receiving said pi and the multiplicand X, and obtaining the negative product (−X·Y) of the data X and Y in response to the $\overline{pi}$ and multiplicand X, on the basis of Booth's algorithm.

18. A multiplier according to claim 17, wherein said $\overline{pi}$ generating means includes means for receiving a control signal and selectively producing the $\overline{pi}$ and the pi in response to the control signal, and said obtaining means selectively obtains the negative product and the positive product of the data X and Y, in response to the $\overline{pi}$ and the pi, respectively.

19. An arithmetic operation circuit comprising a multiplier, including:
   means for receiving data Y and a control signal, and selectively producing pi and $\overline{pi}$ by decoding the data Y, on the basis of the control signal (in which, it is defined that pi=y2i+y2i+1−2y2i+2, $\overline{pi}=\overline{y2i}+\overline{y2i+1}-2\overline{Y2i+2}$, y0=0, and i=0, 1, ...

, (n−1)/2, and yj is a bit data of a jth bit of data Y); and partial-product generating/adding means for receiving the output of said pi and $\overline{\text{pi}}$ generating means and data X, for selectively producing the partial products X·pi and X·$\overline{\text{pi}}$ in response to the pi or $\overline{\text{pi}}$, respectively, and data X, and for selectively outputting the negative product (−X·Y) and the positive product (X·Y) of the data X and Y, by weighting $2^{2i}$ to the produced partial products and by accumulating the resultant data.

20. An arithmetic operation circuit according to claim 19, further comprising including an adding/subtracting circuit for receiving the output of said partial-product generating/adding means, a switching signal, and data Z, and for adding the data Z to or subtracting it from the output of said partial-product generating/adding means.

* * * * *